United States Patent
Rabeler et al.

(10) Patent No.: US 9,274,900 B2
(45) Date of Patent: Mar. 1, 2016

(54) METHOD AND APPARATUS FOR UPDATING FIRMWARE

(71) Applicant: Samsung Electronics Co., LTD, Suwon-si, Gyeonggi-do (KR)

(72) Inventors: Bryan Eugene Rabeler, Keller, TX (US); Tao Xue, Plano, TX (US)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 149 days.

(21) Appl. No.: 14/095,811

(22) Filed: Dec. 3, 2013

(65) Prior Publication Data
US 2015/0154086 A1    Jun. 4, 2015

(51) Int. Cl.
G06F 11/00    (2006.01)
G06F 11/14    (2006.01)

(52) U.S. Cl.
CPC .................... *G06F 11/1469* (2013.01)

(58) Field of Classification Search
CPC .................................................. G06F 11/1469
USPC ............................................. 714/6.24, 30, 31
See application file for complete search history.

(56) References Cited

U.S. PATENT DOCUMENTS

| | | | | |
|---|---|---|---|---|
| 2009/0249320 | A1* | 10/2009 | Su et al. | 717/168 |
| 2012/0317349 | A1* | 12/2012 | Tonami | 711/103 |
| 2013/0124932 | A1* | 5/2013 | Schuh et al. | 714/718 |

* cited by examiner

*Primary Examiner* — Dieu-Minh Le

(57) ABSTRACT

A method for updating firmware in a user terminal comprises dividing files with modified contents into a plurality of groups and assigning each file with respective offset. The method then performs bitwise XOR operations between the plurality of groups onto the backup buffer. Consequently, the method stores a result of the bit XOR operations on the backup buffer into a non-volatile storage as a backup file. An apparatus for updating firmware comprises a processing circuit configured to divide files with modified contents into a plurality of groups and assign each file with respective offset. The processing circuit performs bitwise XOR operations between the plurality of groups onto the backup buffer and store a result of the bit XOR operations on the backup buffer into a non-volatile storage as a backup file.

20 Claims, 5 Drawing Sheets

METHOD AND APPARATUS FOR UPDATING FIRMWARE

TECHNICAL FIELD

The present application relates to updating firmware in a user device over the air. More particularly, the present application relates to a method and apparatus for generating a backup file and recovering corrupted files during a firmware update.

BACKGROUND

Firmware in a user terminal can be updated via a wired or wireless network. For example of an update method via a wireless network, a Firmware-Over-The-Air (FOTA) service delivers an update package to a user terminal wirelessly. The update package includes a series of instructions that, when applied to the existing firmware, update firmware to a newer version. An update agent stored on a user terminal executes the instructions in the update package to modify the existing firmware and produce the updated version.

The firmware in a user terminal may consist of a read-write file system. When the update engine has finished modifying a file in the file system, it may appear as though the changes have been completed since the modified data can be read from the file. However, those changes may only exist in a file system cache and have not yet been flushed out to non-volatile memory, such as a FLASH memory because the file system cache is designed to improve performance by queuing up many changes and then periodically flushing them to a FLASH memory. The file system cache is implemented in Random Access Memory (RAM) and not in non-volatile, permanent storage. Any power failure during firmware update will invalidate all data in the cache, which can cause the user terminal to be inoperable.

SUMMARY

A method for updating firmware in a user terminal is provided. The method includes dividing files with modified contents into a plurality of groups, a largest size of the plurality of groups being equal to or less than the size of a backup buffer. The method also includes assigning each file with respective offset, the offsets indicating file positions within each group. The method further includes performing bitwise XOR operations between each of the plurality of groups and the backup buffer. Consequently, the method also includes storing the result of the bitwise XOR operations on the backup buffer into a non-volatile storage such as a backup file.

An apparatus for updating firmware is provided. The apparatus includes a processing circuit configured to divide files with modified contents into a plurality of groups, a largest size of the plurality of groups being equal to or less than the size of a backup buffer. The processing circuit is configured to assign each file with respective offset, the offsets indicating file positions within each group. The processing circuit then performs bitwise XOR operations between each of the plurality of groups and the backup buffer. Consequently, the processing circuit is configured to store the result of the bitwise XOR operations on the backup buffer into a non-volatile storage such as a backup file.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Figure 1:
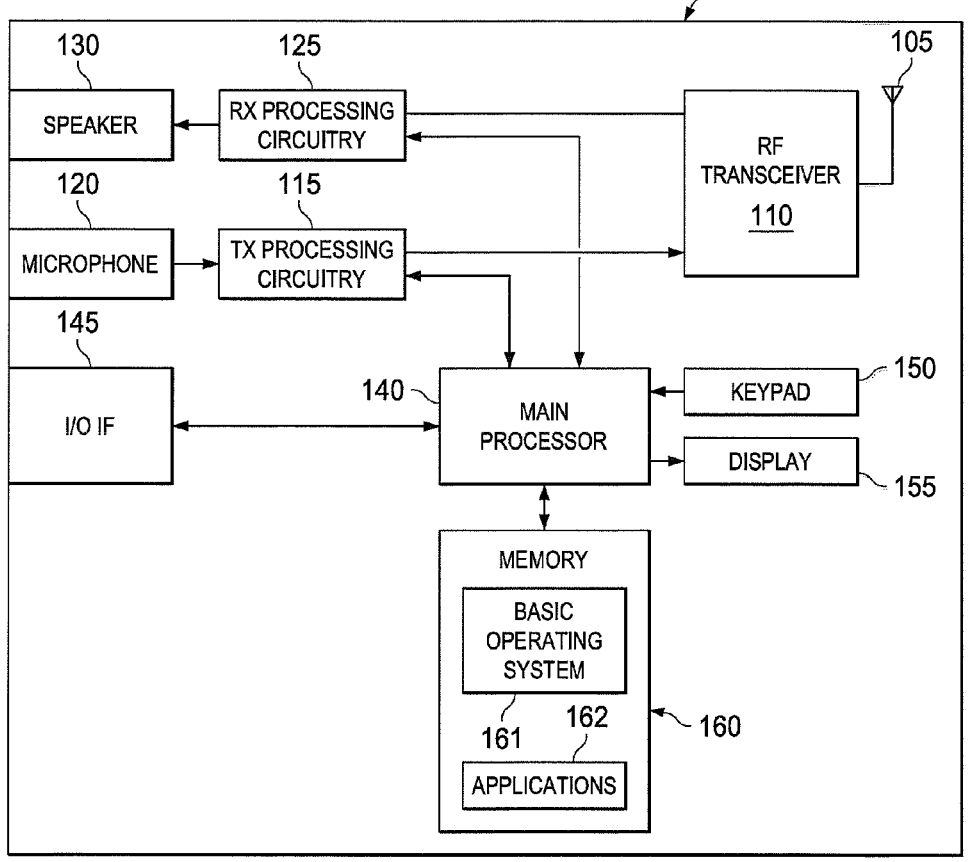
FIG. 1 illustrates a wireless communication device according to embodiments of the present disclosure.

FIG. 1 illustrates a wireless communication device according to embodiments of the present disclosure. Device 100 includes an antenna 105, an RF (radio frequency) transceiver 110, TX (transmission) processing circuitry 115, RX (reception) processing circuitry 125, a main processor (or controller) 140, and a FLASH memory 160. In addition, device 100 can also include a microphone 120, a speaker 130, an input/output (I/O) interface 145, a keypad 150, a touchscreen 155, accelerometer 170, compass 175, and global positioning system (GPS) component 180. The broken lines in FIG. 1 indicate optional components depending on the capabilities of device 100. The present disclosure is not limited to configuration illustration in FIG. 1.

Device 100 can be any device that is capable of wireless communication, such as a laptop computer, a personal computer, a tablet device, an electronic reading device, a mobile station (MS), a personal digital assistant (PDA) device equipped with a wireless modem, a two-way pager, a personal communication system (PCS) device, and such.

Main processor 140 can be implemented as a microprocessor or microcontroller. Main processor 140 executes basic operating system (OS) program, platform, firmware, and such, which can be stored in FLASH memory 160 in order to control the overall operation of the device 100. In certain embodiments in which the device is a wireless mobile station, main processor 140 controls the reception of forward channel signals and the transmission of reverse channel signals by RF transceiver 110, RX processing circuitry 125, and TX processing circuitry 115, in accordance with well known principles. Main processor 140 is also capable of controlling and/or interfacing with GPS 180 in order to determine the location of device 100.

Main processor 140 is also capable of executing other processes and programs that are resident in FLASH memory 160. Main processor 140 can move data into or out of memory 160, as required by an executing process. Main processor 140 can also be coupled to I/O interface 145. I/O interface 145 provides device 100 with the ability to connect to other devices such as laptop computers and handheld computers. I/O interface 145 is the communication path between these accessories and main processor 140. Main processor 140 is further configured to cause the device 100 to perform functions for updating firmware as described in the present disclosure.

Main processor 140 can also be coupled to touchscreen (or a display unit) 155. In some embodiments, main processor 140 can also be coupled to keypad 150. Touchscreen 155 and keypad 150 are used by the end-user of the mobile station to enter data into device 100. Touchscreen 155 is capable of rendering text and/or graphics. Touchscreen 155 can be implemented as a liquid crystal diode (LCD) display, a light emitting diode (LED) display, and such. Alternate embodiments use other types of displays. Touchscreen 155 is the hardware interface with which a user can input custom gestures. In certain embodiments, a dedicated area of touchscreen 155 can be dedicated for receiving custom gestures.

The FLASH memory 160 is coupled to main processor 140. The FLASH memory 160 can be comprised of any non-volatile storage device. The FLASH memory 160 stores the firmware that provides the basic operational control of device 100. In an embodiment, the FLASH memory 160 can also store applications. Though not illustrated, the device 100 can also include other types of storage such as random access memory (RAM) for temporarily storing programs and other storage devices for storing other types of user data.

The device 100 also supports wireless communication. The RF transceiver 110 receives, from antenna 105, an incoming RF signal transmitted through a wireless communication network. The RF transceiver can support one or more wireless communication protocols. The RF transceiver 110 down-converts the incoming RF signal to produce an intermediate frequency (IF) or a baseband signal. The IF or baseband signal is sent to RX processing circuitry 125 that produces a processed baseband signal by filtering, decoding, and/or digitizing the baseband or IF signal to produce a processed baseband signal. RX processing circuitry 125 transmits the processed baseband signal to speaker 130 (i.e., voice data) or to main processor 140 for further processing (i.e., web browsing).

TX processing circuitry 115 receives analog or digital voice data from microphone 120 or other outgoing baseband data (i.e., web data, e-mail, interactive video game data) from main processor 140. TX processing circuitry 115 encodes, multiplexes, and/or digitizes the outgoing baseband data to produce a processed baseband or IF signal.

RF transceiver 110 receives the outgoing processed baseband or IF signal from TX processing circuitry 115. RF transceiver 110 up-converts the baseband or IF signal to an RF signal that is transmitted via antenna 105.

In certain embodiments, device 100 can include location circuitry configured to perform location and movement detection. The location circuitry can include on or more of: an accelerometer 170, a compass 175, and GPS component 180.

Figure 2:
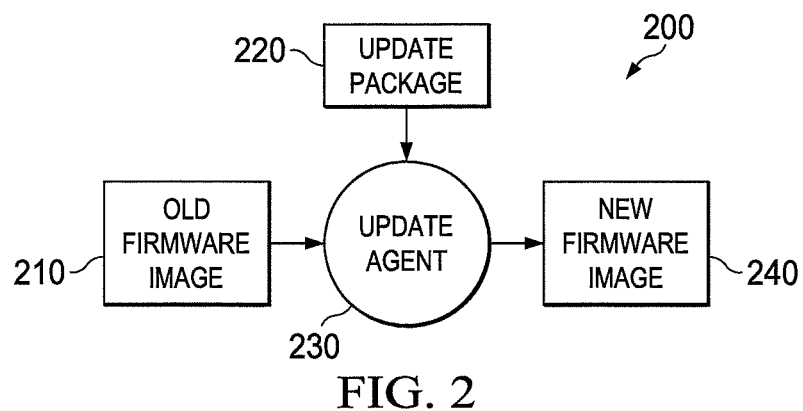
FIG. 2 illustrates how an update engine performs an update process according to the principles of the present disclosure.

FIG. 2 illustrates how an update engine performs an update process 200 according to the principles of the present disclosure. The embodiment of update process shown in FIG. 2 is for illustration only. Other embodiments could be used without departing from the scope of this disclosure.

The update agent 230 works on a wireless communication device (e.g. the wireless communication device 100) to handle the update of the wireless communication device. To this end, the update agent 230 uses an update package 220 to perform this transformation. The update package 220 contains the information necessary to produce the new firmware image 240. As such, the wireless communication device receives data packets that include portions of the update package 220 through the RF transceiver and processes the received data packets in the RX processing circuitry. The main processor executes the update agent 230 to update the old firmware image 210 according to the received update package 220 by updating the FLASH blocks that correspond to the portions of the old firmware image 210 that are to be updated. According to certain embodiments, the update agent 230 can be implemented in a program. According to certain embodiments, the update agent 230 can be included in a program that is stored in the FLASH memory or implemented in hardware as a Field Programmable Gate Array (FPGA) or an Application Specific Integrated Circuit (ASIC). For example, the firmware image resides on the FLASH memory 160 of the wireless communication device 100. The characteristics of the FLASH memory 160 define the challenge that embodiments of the present disclosure deal with.

In certain embodiments, the update agent 230 is employed on a wire-line communication device (e.g. a set-top box, and the like) to handle the update of the communication device. For example, the update agent 230 can update FLASH blocks on the set-top box (or other specified wire-line device) for a television. In addition, the update package can be stored on a standard definition (SD) card or a universal serial bus (USB) device. Alternatively, the update package can be obtained over an Ethernet network or the like.

Generally, the fault tolerant algorithm in the update engine can only tolerate one corrupted file at a time. Thus if the update engine modifies multiple files before the file system decides to flush to a FLASH memory, then it is possible that a sudden power loss could interrupt the flush write back to a FLASH and more than one file can be corrupted.

When each file modification is complete, the update engine issues a SYNC command to the file system to force it to flush all changes back to a FLASH memory. The disadvantage of issuing the SYNC command is a decrease in performance, because the command is forcing the file system to flush its cache to non-volatile memory instead of letting the file system optimize its writes to non-volatile memory. The repeated SYNC commands can add a significant amount of time to the overall apply time of the update. The SYNC command is issued after each file modification because the fault tolerance algorithm in the update engine can only handle one corrupted file.

Figure 3:
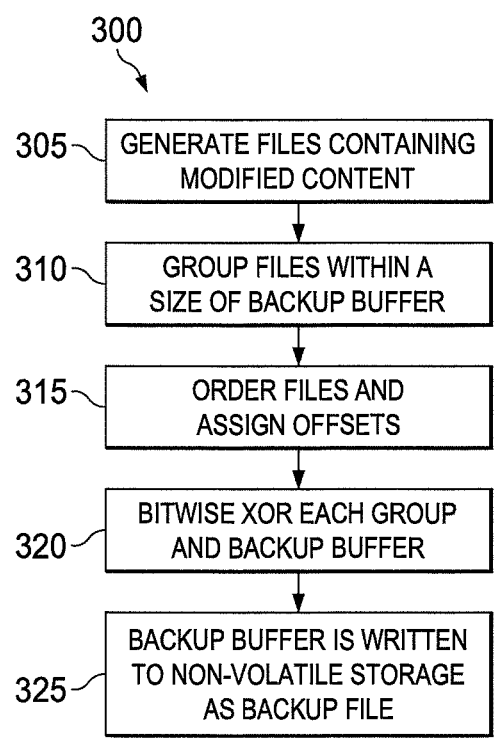
FIG. 3 is a flowchart illustrating generation of a backup file according to embodiments of the present disclosure.

FIG. 3 is a flowchart 300 illustrating generation of a backup file according to embodiments of the present disclosure. While the flowchart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The operation depicted in the example depicted is implemented by processing circuitry in a user terminal.

One of the recovery processes using a backup file during an update process is disclosed in U.S. application Ser. No. 13/493,383 filed by the applicants and entitled "Fault Tolerant FOTA Update With Single Backup Block Write", and the disclosure of the foregoing application is incorporated herein by reference in its entirety. In U.S. Application Serial No. U.S. Ser. No. 13/493,383, the modified content of blocks (or files) are bitwise XOR'ed together into a backup buffer and that backup buffer is written to a FLASH memory as the backup file. The backup file can then be used to recover a single corrupted file after a power loss during update. The recovery operation is possible because of the remaining files, each file has either been modified already or has yet to be modified. The files already modified can be read into a buffer and individually bitwise XOR'ed with the backup buffer. The files that have yet to be modified can be modified using instructions in the delta package and then each individually bitwise XOR'ed with the backup buffer. This will leave the backup buffer containing the modified content of the corrupted file.

The embodiments of the present disclosure builds on U.S. application Ser. No. 13/493,383 by generating the backup buffer in a way so as to allow for multiple files to be written to a FLASH memory (and possibly corrupted by a sudden power loss) before a SYNC command is issued. The embodiments changes the way the backup file is generated such that the modified content of multiple files will be concatenated together to form a larger buffer first and then that buffer will be bitwise XOR'ed with the backup buffer. Consequently, the number of SYNC commands is reduced from that of the case of generating the modified content of each file and bitwise XOR'ing them with the backup buffer separately.

In certain embodiments of the present disclosure, the backup file is generated using the following operations. In operation 305, the update engine reads the files to be modified from the file system into a cache memory and generates the modified content for each file to be modified, using the original content and the instructions in the delta package.

In operation 310, a certain process, such as caused in response to execute a plurality of instructions in memory 160, is used to divide the files with modified content into a plurality of groups, wherein the sum of the sizes of the modified contents in each group does not exceed the size of backup buffer. The size of backup buffer is referred to as 'S' in the present disclosure. In certain embodiments, the backup buffer can have a maximum available size to use for the backup file. For instance, this size S can be at least as large as the modified content of the largest file needing updating. In other words, the backup buffer has a size equal to, or greater than that of the largest sum of modified contents in a group.

In certain embodiments, the goal of division is to minimize the number of groups needed. This division approach is equivalent to the famous bin packing problem, which is known as Non-deterministic Polynomial-time hard (NP-hard). The exact algorithm used is not important to the present disclosure. For example, a simple algorithm, known as First Fit Decreasing (FFD), produces a good approximation by first sorting the files in decreasing size of their modified content, then assigning each file to the first group able to accommodate it.

The assignment of files to groups can either be done dynamically on the target device to be updated, or statically assigned beforehand on the server when the delta package is generated. Each approach has its advantages. The grouping on the target device allows the maximum size of the backup file, S to change. Alternatively, the grouping on the server alleviates the update engine from spending precious time performing this grouping calculation and allows for a potentially better bin packing solution since more computation power is available, however this requires the size of backup buffer, S to be known at delta generation time.

In operation 315, the files in each group are arranged in a certain order. The arranging order does not need to be limited to be a specific way in the present disclosure. For example, the arranging order can be their relative sequences in the delta package, or based on their pathnames in the file system. Based on the order, each file is assigned an offset so as to virtually concatenate all the files in the group into a single buffer. In certain embodiments, the files are concatenated together one after another with no empty or spare bytes in between so as to conserve space, however this is not strictly necessary. The offset for each file indicates at which location in the backup buffer the modified contents of each file will be bitwise XOR'ed.

In operation 320, the modified contents of each group are bitwise XOR'ed with the backup buffer. The order in which the groups are bitwise XOR'ed in this step does not matter and can be done in any suitable order, because bitwise XOR is commutative.

In operation 325, the backup buffer is now written as the backup file. The backup file is written to a non-volatile memory, such as a FLASH memory as the backup file. Once the backup file is generated, the update agent can begin to update the firmware in a fail-safe manner, which is described later in detail with reference to FIG. 6. If a power loss occurs which results in some of the files being corrupted, then the update agent can use the backup file to recover the corrupted files and resume the update, which is described later in detail with reference to FIG. 7 and FIG. 8.

Figure 4:
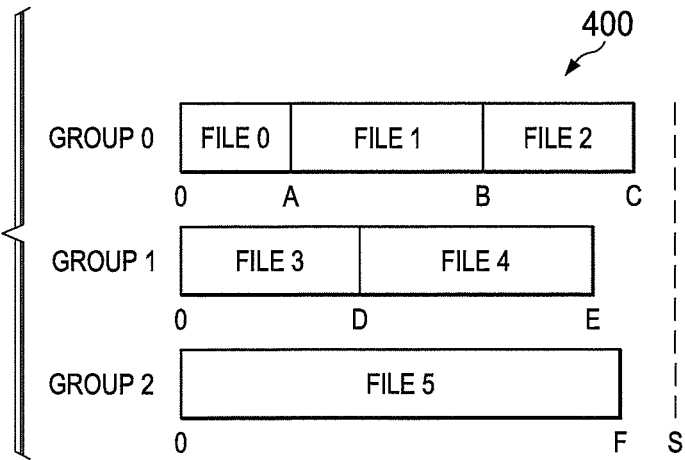
FIG. 4 illustrates grouping files and assigning offsets during a backup file generating process according to embodiments of the present disclosure.

FIG. 4 illustrates grouping the files and assigning the offsets 400 during the backup file generating process according to embodiments of the present disclosure. The embodiment shown in FIG. 4 is for illustration only. Other embodiments could be used without departing from the scope of this disclosure.

In certain embodiment, there are six files, files 0 to 5, to be updated. The update agent generates the modified content for each file to be modified, using the original content and the instructions in the delta package. Then these files with modified contents are assigned to a total of three groups, groups 0 to 3. In the embodiments, the first three files, files 0 to 2, are assigned to group 0, files 3 and 4 are assigned to group 1, and file 5 is assigned to group 2. The dotted line on the right indicates the size of backup buffer, S, which is the largest possible group size. Along with file grouping, offsets are assigned to the files.

In certain embodiments, offset A is the size of the modified content of file 0, offset B is the sum of the sizes of the modified contents of file 0 and file 1, offset C is the sum of the sizes of the modified contents of files 0 to 2, offset D is the size of the modified content of file 3, offset E is the size sum of the modified contents of files 3 to 4, and offset F is the size of the modified content of file 5. The largest group, group 0 has size of C that is less than S as required.

Figure 5:
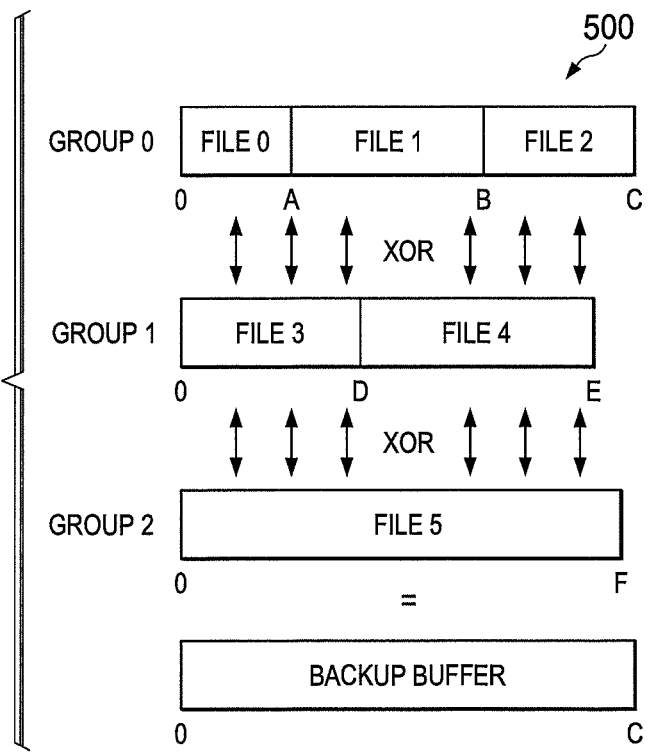
FIG. 5 illustrates performing bitwise eXclusive OR (XOR) operations during the backup file generating process according to embodiments of the present disclosure.

FIG. 5 illustrates bitwise XOR operations 500 during the backup file generating process according to embodiments of the present disclosure. The embodiments shown in FIG. 5 are for illustration only. Other embodiments could be used without departing from the scope of this disclosure.

Once the files with modified contents are grouped and assigned with offsets, the modified contents of each file are bitwise XOR'ed together at each file's assigned offset and the result of the XOR operation is data of the backup buffer. This bitwise XOR operation process can be expressed as follows:

$$\text{group 0 XOR group 1 XOR group 2} = \text{backup buffer} \quad (\text{Eq. 1})$$

In certain embodiments, the size of the backup buffer is C. The size "C" can be determined or established based on, or equal to the size of the largest group.

Figure 6:
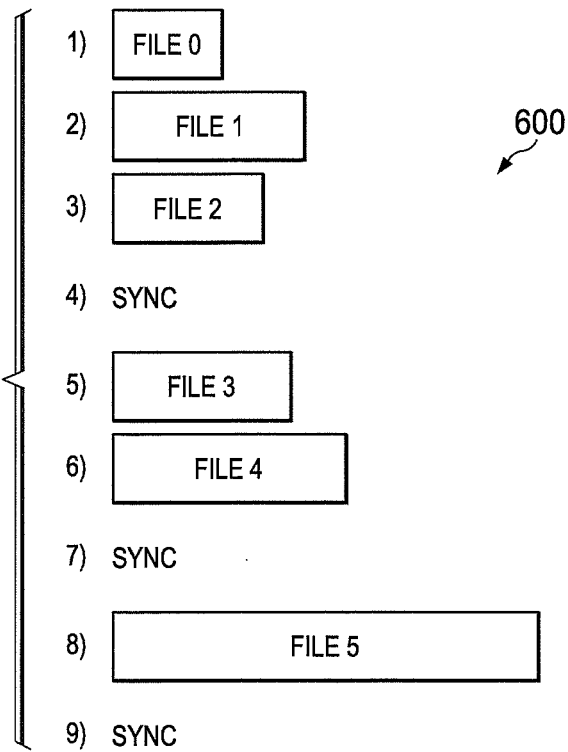
FIG. 6 illustrates an updating firmware process in the file system according to embodiments of the present disclosure.

FIG. 6 illustrates updating firmware process 600 in the file system according to embodiments of the present disclosure. The embodiments shown in FIG. 6 are for illustration only. Other embodiments could be used without departing from the scope of this disclosure.

In certain embodiments, the update engine updates the files in the file system by updating one group at a time. To update the files in the file system, the update engine reads the files to be modified from the file system and modifies their original contents of the files, using the delta package. When updating files in a given group, the update engine can modify the files in an order of offsets, a delta package order or any suitable order it desires. Once all of the files from the group are updated, the update engine issues a SYNC command to flush the updated content into a non-volatile storage such as a FLASH memory. The update engine moves to the next group and continues to update files of the next group. The updating order of groups also does not limit the scope of this present disclosure.

In certain embodiments, the files in group 0 are updated, which are file 0, file 1, and file 2 at first. Once all of the files in the group 0 are updated, a SYNC command is issued. Next, the files in group 1 are updated, which are file 3 and file 4, after that another SYNC command is issued. Then, file 5 in group 2 is updated, followed by a third SYNC command. As stated above, the order of groups during an update process can vary and does not limit the scope of the present disclosure.

In general, the larger the size of the backup buffer is allowed to be, the fewer SYNC commands is required and thus the speed of update process will be faster. However, if S is larger than the size of the file system cache, then the file system will be required to issue a SYNC on its own in addition to any SYNC commands from the update agent, thus decreasing performance. Thus it is recommended that S be chosen to be slightly smaller than the file system cache size.

The backup file contains a result of the bitwise XOR operation between concatenated modified content in each group, thus allows multiple files to be modified in a group before a SYNC command is issued. The fewer number of groups, the fewer number of SYNC commands are required.

In certain embodiments, the backup file itself can also be generated offline. The backup file could also be generated on the target in the background prior to update, thus hiding this time from the actual update time.

Figure 7:
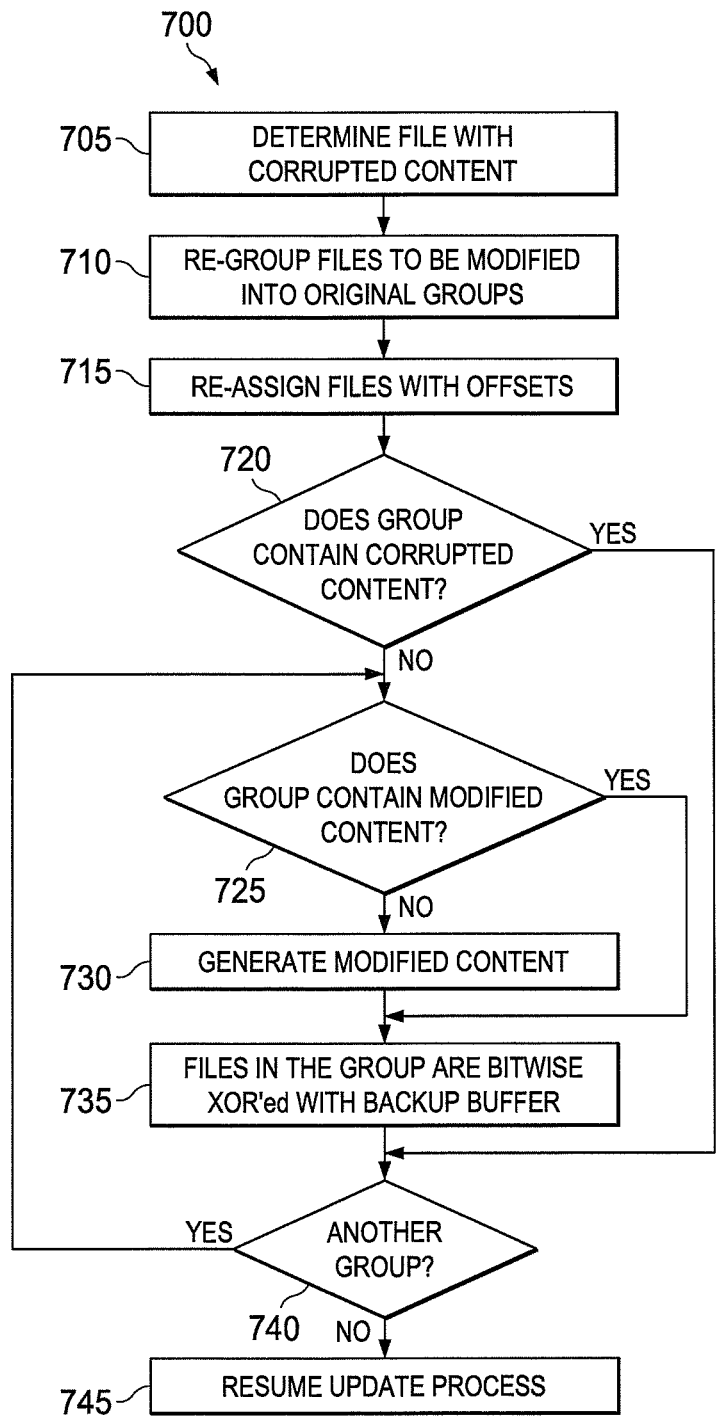
FIG. 7 is a flowchart illustrating a recovery process according to embodiments of the present disclosure.

FIG. 7 illustrates the recovery operation 700 according to embodiments of the present disclosure. While the flowchart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The operation depicted in the example depicted is implemented by processing circuitry in a user terminal.

During the update process, if a power loss occurs, the device can be left with a corrupted firmware, and therefore can be in an inoperable state. Therefore, if this is the case, the update engine needs to recover the corrupted or missing content before resuming the update process. The recovery process is possible if all of the corrupted files are from the same group as was generated as described with respect to FIG. 3. The update engine recovers the corrupted or missing content through the following steps.

In operation 705, the update engine determines which file contains corrupted content in operation. Determining which file contains original content, modified content, or corrupted contents, can be accomplished by using one of many existing art algorithms, for example, U.S. application Ser. No. 13/307,230 filed by one of the applicants, entitled "apparatus and method for fault tolerant FOTA update" and the disclosure of the foregoing application is incorporated herein by reference by its entirety.

Next, the update engine assigns the files into the same groups (operation 710) and assigns the same offsets to the files as was done when generating the backup file (operation 715). In certain embodiments, this grouping calculation can be repeated on the target device. Alternatively, the assignments can be made offline and stored in a location where the update engine can access them.

For a group with the files containing corrupted contents, that group is skipped and the next group is processed (operations 720 and 740). For a group with the files containing modified contents, the update engine performs bitwise XOR operations with the backup buffer that was read from the file system (operations 725 and 735). For a group with the files containing original contents, the update engine generates the modified contents using the original content and the instructions in the delta package (operation 730). Then, the group with files with modified contents is bitwise XOR'ed with the backup buffer (operation 735).

Once the bitwise XOR operations are completed between the backup buffer and the contents of non-corrupted groups each other, the backup buffer will contain the modified content of the group with the corrupted files. The update engine resumes the update process using the recovered files (operation 745).

Figure 8:
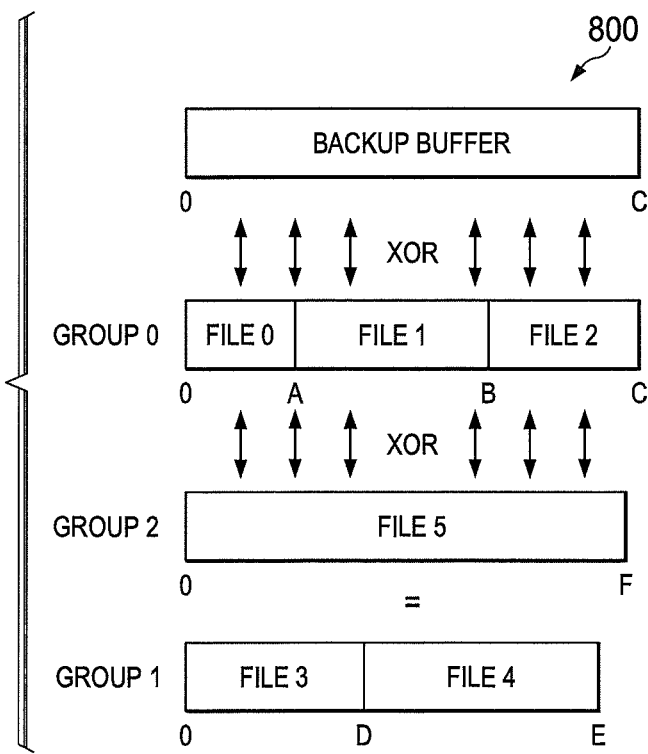
FIG. 8 illustrates how a corrupted file is recovered during a recovery process according to embodiments of the present disclosure.

FIG. 8 illustrates the recovery operation 800 according to embodiments of the present disclosure. The embodiment shown in FIG. 8 is for illustration only. Other embodiments could be used without departing from the scope of this disclosure.

In one example of certain embodiments described with reference to FIG. 3, a power loss occurs while the update engine is writing the updated content of file 4 into a non-volatile memory. When the update engine resumes the updating process, the engine determines whether any of files to be modified is corrupted. In certain embodiments, the update engine determines that files 0 to 3 contains modified contents, file 4 contains corrupted content, and file 5 contains yet original content (i.e., non-modified content).

The update engine recovers the corrupted (i.e., missing) content of file 4 using the following steps: First, the update engine assigns files with the same groups the same offsets as was done when generating the backup file: files 0 to 2 into group 0, files 3 and 4 into group 1, and file 5 to group 2. Meanwhile, the update engine reads the backup file from FLASH into a backup buffer.

For the files 0 to 2 of group 0 that contain modified content, the update engine performs bitwise XOR operation with the backup buffer and these files at their assigned offsets and stores the result back in the backup buffer. For file 5 of Group 2 that contains original content, the update engine generates its modified content using the original content and the instructions in the delta package. Upon modification of file 5, the update engine performs a bitwise XOR operation with the backup buffer and the modified content of file 5 at its assigned offset and stores the result back in the backup buffer. Then, the backup buffer will contain the modified content of group 1 as a result of the XOR operations, as follows:

$$\text{backup buffer XOR group 0 XOR group 2} = \text{group 1} \quad (\text{Eq. 2})$$

Through the above procedures, the update engine can restore each corrupted file and resume the update process.

In practice, a typical large update can modify upwards of 500 files. Most of these files are quite small, such as only a few kilobytes (KB). Therefore many files can be packed into a single group. Thus certain algorithms would require over 500 SYNC commands, whereas the embodiments the present disclosure typically requires less than 10 SYNC commands. This can reduce the overall update time by approximately 20%. Accordingly, the embodiments of the present disclosure reduce the number of SYNC commands that are required and add the ability for the update engine to resume from a power failure even if multiple files are corrupted.

Although described in exemplary embodiments, aspects of one or more embodiments can be combined with aspects from another embodiment without departing from the scope of this disclosure.

Although various features have been shown in the figures and described above, various changes may be made to the figures. For example, the size, shape, arrangement, and layout of components shown in FIGS. 1 and 2 are for illustration only. Each component could have any suitable size, shape, and dimensions, and multiple components could have any suitable arrangement and layout. Also, various components in FIGS. 1 and 2 could be combined, further subdivided, or omitted and additional components could be added according to particular needs. Further, each component in a device or system could be implemented using any suitable structure(s) for performing the described function(s). In addition, while FIGS. 3 and 7 illustrate various series of steps, various steps in FIGS. 3 and 7 could overlap, occur in parallel, occur multiple times, or occur in a different order.

Although the present disclosure has been described with an exemplary embodiment, various changes and modifications can be suggested to one skilled in the art. It is intended that the present disclosure encompass such changes and modifications as fall within the scope of the appended claims.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for updating firmware in a user terminal, the method comprising:
    categorizing files with updated firmware contents into a plurality of groups, a largest size of the plurality of groups being equal to or less than a size of a backup buffer;
    assigning each file with respective offsets, the respective offsets indicating file positions within each group;
    performing bitwise XOR operations between each of the plurality of groups; and
    storing a result of the bitwise XOR operations between each of the plurality of groups on the backup buffer into a non-volatile storage as a backup file.

2. The method as set forth in claim 1, further comprising:
    generating the files with updated contents using original content and instructions in a delta package.

3. The method as set forth in claim 1, further comprising:
    issuing a synchronization signal to flush the files of each group to the non-volatile storage.

4. The method as set forth in claim 3, wherein the files are divided to minimize a number of groups.

5. The method as set forth in claim 1, further comprising:
    the non-volatile storage is a FLASH memory.

6. The method as set forth in claim 1, the method comprising:
    determining which files have been corrupted during the update process;
    re-grouping the files with the updated contents into the plurality of groups;
    assigning each file with respective offset, the offsets indicating file positions within each group;
    reading the backup file from the non-volatile storage into the backup buffer; and
    recovering the corrupted files by performing the bitwise XOR operations between the backup buffer and each of the plurality of groups, except the group with the corrupted files.

7. The method as set forth in claim 6, the method comprising:
    resuming the update process using the recovered file.

8. The method as set forth in claim 6, the method comprising:
    for a file containing original content, modifying the file, using original content and instructions in a delta package.

9. The method as set forth in claim 1, wherein grouping of the files is performed either dynamically on the user terminal or statistically on the server when the delta package is generated.

10. The method as set forth in claim 1, wherein the files contain firmware to operate the user terminal.

11. An apparatus for updating firmware, the apparatus comprising a processing circuit configured to:
    divide files with updated contents into a plurality of groups, a largest size of the plurality of groups being equal to or less than a size of a backup buffer;
    assign each file with respective offsets, the respective offsets indicating file positions within each group;
    perform bitwise XOR operations between each of the plurality of groups; and
    store a result of the bitwise XOR operations between each of the plurality of groups on the backup buffer into a non-volatile storage as a backup file.

12. The apparatus as set forth in claim 11, the processing circuit further configured to:
   generate the files with updated contents using original content and instructions in a delta package.

13. The apparatus as set forth in claim 11, the processing circuit further configured to:
   issue a synchronization signal to flush the files of each group to the non-volatile storage.

14. The apparatus as set forth in claim 11, wherein the non-volatile storage is a FLASH memory.

15. The apparatus as set forth in claim 11, the processing circuit further configured to:
   determine which files have been corrupted during the update process;
   re-group the files with updated contents into the plurality of groups;
   assign each file with respective offset, the offsets indicating file positions within each group;
   read the backup file from the non-volatile storage into the backup buffer; and
   recover the corrupted files by performing the bitwise XOR operations between the backup buffer and each of the plurality of groups, except a group with the corrupted files.

16. The apparatus as set forth in claim 11, the processing circuit further configured to:
   resume update process using the recovered files.

17. The apparatus as set forth in claim 11, the processing circuit further configured to:
   for a file containing original content, modifying the file, using original content and instructions in a delta package.

18. The apparatus as set forth in claim 11, wherein grouping of the files is performed either dynamically on the user terminal or statistically on the server when the delta package is generated.

19. The apparatus as set forth in claim 11, wherein the files are divided to minimize a number of groups.

20. The apparatus as set forth in claim 11, wherein the files with updated contents contains firmware to operate the user terminal.

* * * * *